United States Patent [19]

Kruger et al.

[11] 4,011,737
[45] Mar. 15, 1977

[54] DEVICE FOR FASTENING A WHEEL DISC ON A SHAFT

[76] Inventors: Wolfgang Kruger, Kohlstattstr. 26, 8069 Priel; Hagen Hanser, Pagodenburg-strasse, 8000 Munich 60, both of Germany

[22] Filed: Dec. 11, 1975

[21] Appl. No.: 639,817

[30] Foreign Application Priority Data

Dec. 21, 1974 Germany .................... 2460739

[52] U.S. Cl. ............................ 64/9 A; 416/214 A; 416/241 B
[51] Int. Cl. ........................................... F16D 3/18
[58] Field of Search ........... 64/25; 46/241 B, 214 A

[56] References Cited

UNITED STATES PATENTS

| | | | |
|---|---|---|---|
| 1,721,060 | 7/1929 | Swartz | 64/9 A |
| 3,943,703 | 3/1976 | Kronojard | 416/214 A |

FOREIGN PATENTS OR APPLICATIONS

| | | | |
|---|---|---|---|
| 870,124 | 3/1942 | France | 416/241 B |
| 735,504 | 4/1943 | Germany | 416/241 B |

Primary Examiner—Samuel Scott
Assistant Examiner—Randall Heald
Attorney, Agent, or Firm—Haseltine, Lake & Waters

[57] ABSTRACT

A device for the torque-transmissive securing of a disc which is formed of a brittle material, in particular a turbine wheel constituted of a ceramic material, onto a shaft. The disc is centered through the intermediary of two cone pairs with axial prestressing and the torque is transmitted to the shaft through a cylindrical extension of the wheel hub with longitudinal grooves formed on the outer circumference thereof; furthermore transmitted by means of a cylindrical bellshaped cover with symmetrically profiled longitudinal connectors in an inner bore which are conformed to the longitudinal grooves, and finally by rollers located between the concave side edges or slopes and the side walls of the longitudinal grooves in radial and tangential contact therewith, by means of the bell-shaped cover which is rigidly fixed on the shaft.

2 Claims, 3 Drawing Figures

DEVICE FOR FASTENING A WHEEL DISC ON A SHAFT

FIELD OF THE INVENTION

The present invention relates to a device for the torquetransmissive securing of a disc which is formed of a brittle material, in particular a turbine wheel constituted of a ceramic material, onto a shaft.

DISCUSSION OF THE PRIOR ART

The joining of brittle constructional elements, in particular ceramic components with, on the one hand, resilient components such, as for instance, those made of steel and, on the other hand, particularly shafts, is difficult, especially when there is a concurrent requirement for torque tranmission, minimum imbalance and precise centering. An important cause of these difficulties lies in the low elastic or resilient deformability of the ceramic material. Even with gas turbines where there it is attempted to obtain a continual increase in the turbine inlet temperatures, there is a tendency to more readily consider the use of turbine discs or wheels which are made of ceramic, due to its high temperature resistance, and to also test them in actual practice. Hereby, in addition to good centering, it is also desired to obtain a uniform introduction of the torque. Above all, the above-mentioned problems will always occur, because the shafts are extensively made of steel and the discs should be dismountable therefrom.

SUMMARY OF THE INVENTION

Accordingly, it is an object of the present invention to provide a construction in which, notwithstanding certain manufacturing imprecisions, and notwithstanding different thermal expansion, as well as with disregard of the different elastic deformation, the disc is satisfactorily centered during all operating conditions, and the torque is uniformly transmitted to the periphery thereof.

The foregoing object is attained in that the disc is centered through the intermediary of two cone pairs with axial prestressing and the torque is transmitted to the shaft through a cylindrical extension of the wheel hub with longitudinal grooves formed on the outer circumference thereof; furthermore trasmitted by means of a cylindrical bell-shaped cover with symmetrically profiled longitudinal connectors in an inner bore which are conformed to the longitudinal grooves, and finally by rollers located between the concave side edges or slopes and the side walls of the longitudinal grooves in radial and tangential contact therewith, by means of the bell-shaped cover which is rigidly fixed on the shaft.

Due to the axial prestressing, there is taken into calculation the different thermal expansion of the disc and shaft and their radial expansion resulting from centrifugal force and the precise centering is afforded at all times, while the rollers which are located between the profiled side edges of the connectors and the side walls of the longitudinal grooves will uniformly transmit the torque during operation without producing any imbalance.

In a further embodiment of the coupling, the rollers are provided with holes at their axis so as to be concurrently more resilient and lighter for their pliant fitting whereby any imbalance which is caused by even slight deviations from an ideal arrangement, is reduced.

BRIEF DESCIPTION OF THE DRAWINGS

Reference may now be had to the detailed description of a preferred embodiment of the invention showing a ceramic turbine disc with centering and transmission of torque pursuant to the invention; taken in conjunction with the accompanying drawings; in which.

DETAILED DESCRIPTION

Figure 1:
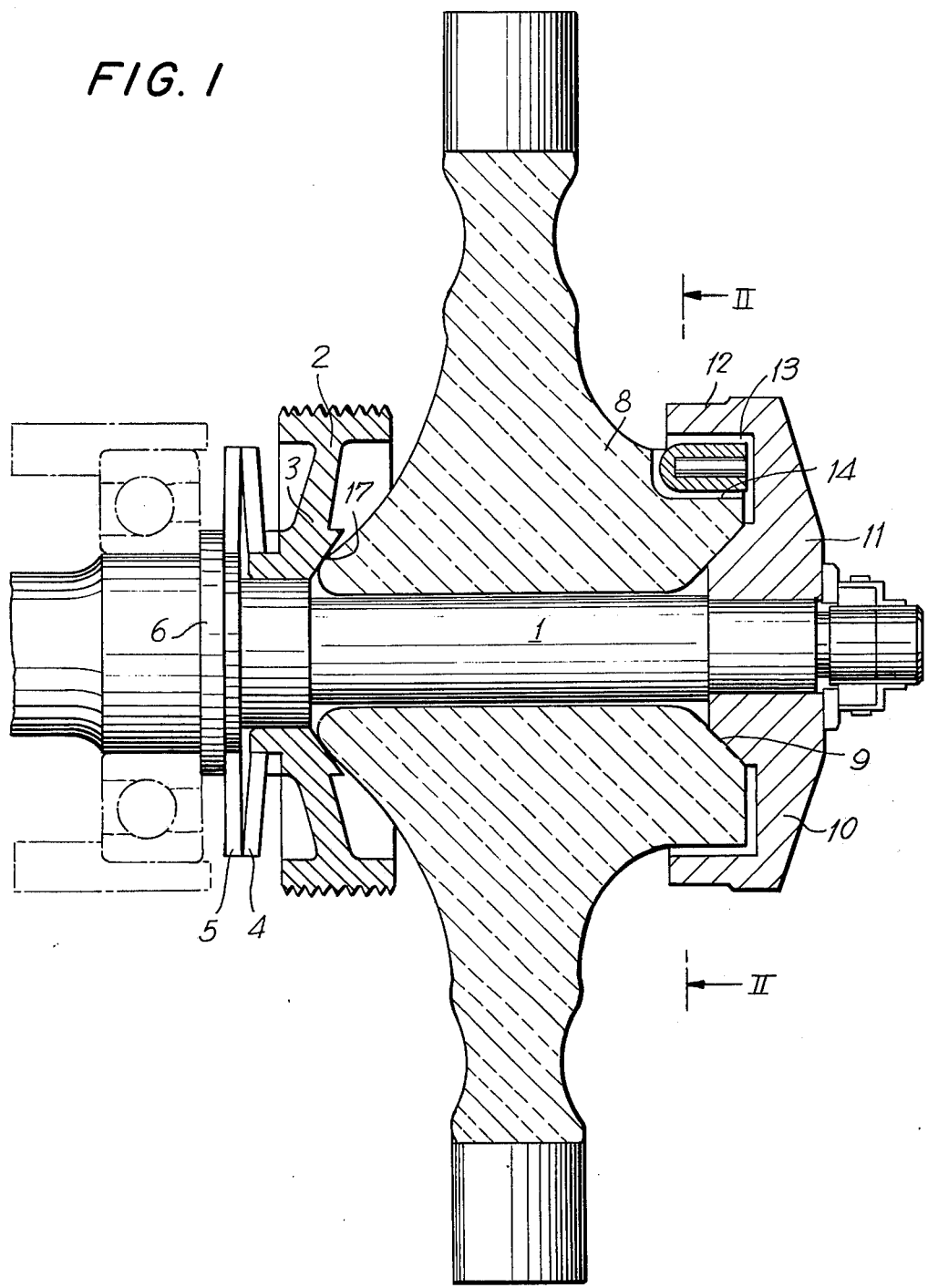
FIG. 1 illustrates an end sectional view through a ceramic turbine disc which is mounted on a shaft.
Figure 2:
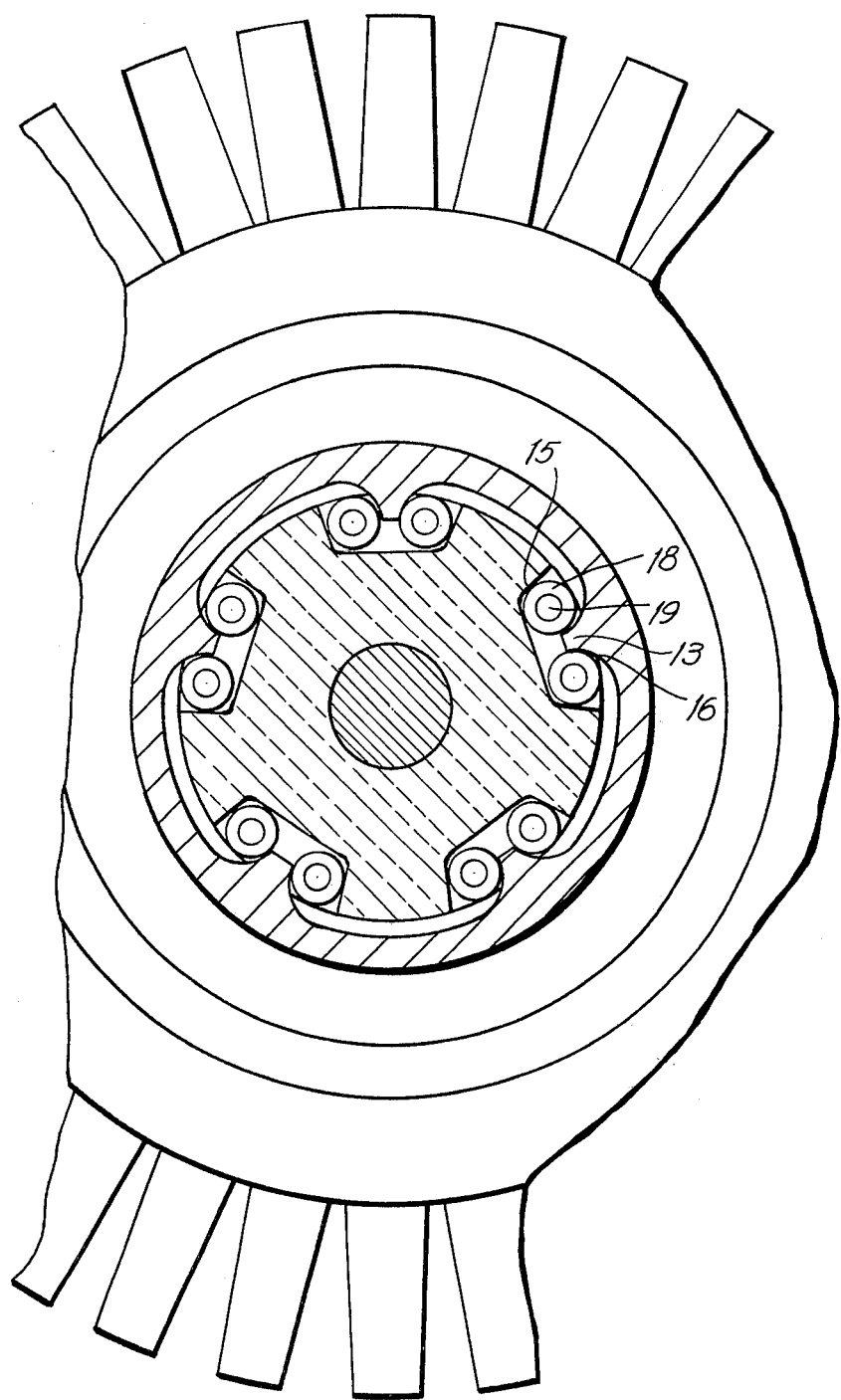
FIG. 2 shows a section taken along line II — II on the turbine disc in FIG. 1.
Figure 3:
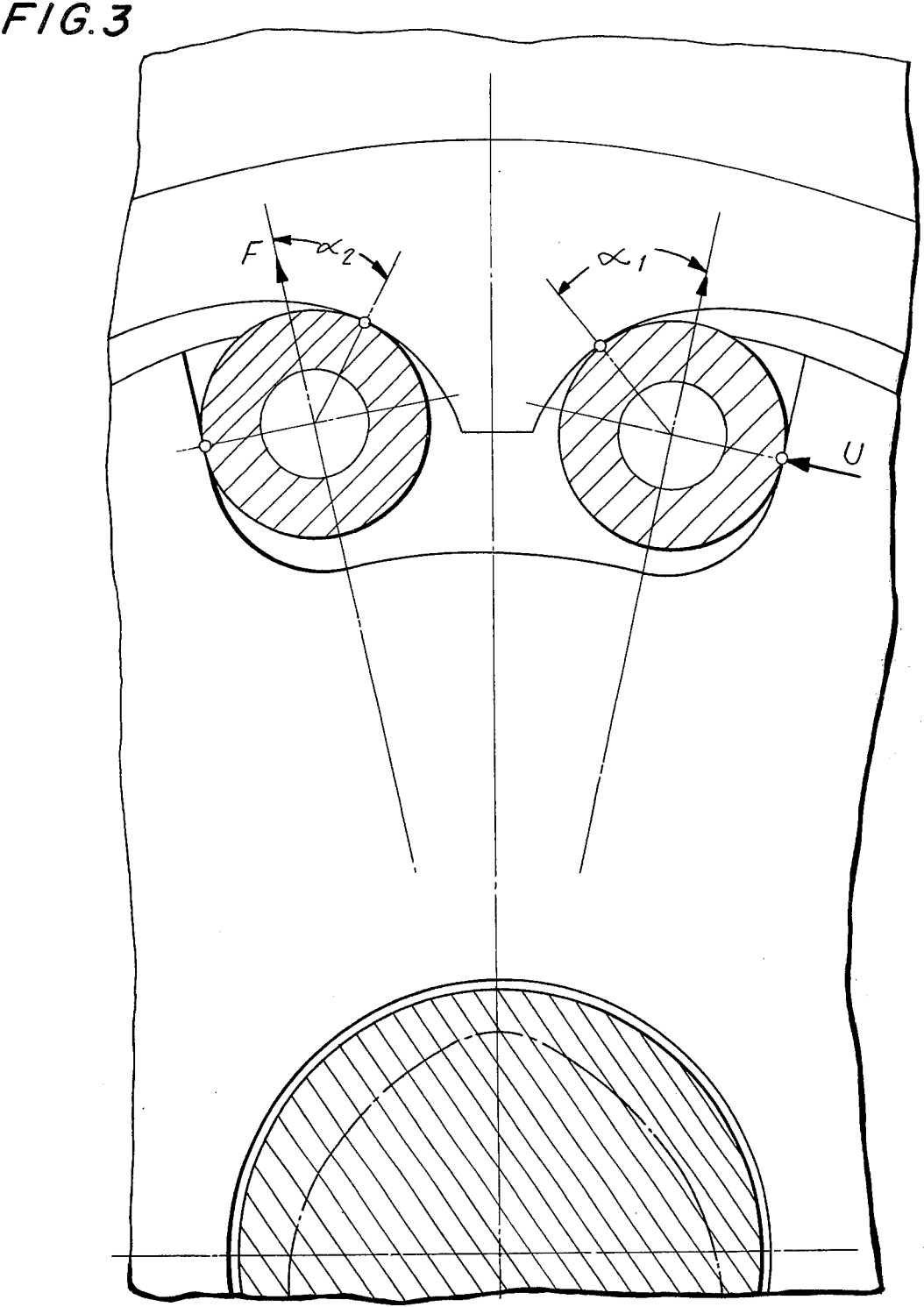
FIG. 3 shows an enlarged fragmentary detail of the turbine disc of FIG. 1.

Seated on a shaft 1, the latter of which is stepwise reduced, is a labyrinth ring 2 having a first inner cone 3, at the end facing the bearing side. The labyrinth ring is resiliently supported by two plate springs 4, 5 against the collar 6 and is centered on the shaft. A turbine disc 7 is provided on one side thereof, with a first outer cone 17 which lies against the first inner cone 3 and the other side, with a cylinder-like extension 8 of the wheel hub having a second inner cone 9, the latter of which is supported against a second outer cone 10 of a coupling bell-shaped top 11 (driving bell). Limited play is provided between the shaft and inner bore of the wheel which readily allows for radial shrinkage as will occur during operation. The coupling bell top 11 externally grips the cylinder-like extension 8 of the wheel hub by means of its tubular outer rim 12 (FIG. 1). Located at the inner side of the tubular outer rim of the coupling bell top 11, and evenly distributed about the periphery thereof, are a number n of symmetrically profiled longitudinal lands or protuberances 13 which project into an equal number n of longitudinal grooves 14 at a considerable sideways clearance whereby the longitudinal grooves 14 are worked into the external surface of the cylinderlike extension 8 of the wheel hub. The longitudinal grooves 14 are so wide that, between the two side edges of the lands 13 which project into the grooves 14 and the sidewalls 15 of the longitudinal grooves 14, there remains space for two cylindrical rollers 18 which are presently to be inserted between the land 14 and the sidewalls 15. In order to reduce their weight, the rollers 18 may have a bore 19 provided therein. Each roller is pressed by centrifugal force during operation, on the one side, against a sidewall 15 of the longitudinal groove and, on the other side, against an arched side edge 16 of the longitudinal protuberance or land. These support themselves against the concave edges of the longitudinal lands 14 and against the walls of the longitudinal grooves and thereby transmit the torque, or, the torque-transmissive peripheral force. The hub is hereby displaced so far with respect to the driving component until, in the ideal frictionless case, a state of equilibrium is obtained through the reaction force n·F (tan $x\ \alpha_1$ — tan $x\ \alpha_2$). The angles $\alpha_1$ and $\alpha_2$ are formed from the effective direction of the centrifugal force F and the normals to the tangents at the point of contact between the roller and longitudinal land, and are equal when no peripheral force is transmitted.

When a torque is transmitted, then the angle $\alpha_1$ increases, and namely at the roller, which is loaded by the peripheral force component U/n, whereby the number of the transmitting rollers is concurrently the number of longitudinal grooves or lands. The total torque is While there has been shown what is considered to be the preferred embodiment of the invention, it will be obvious that modifications may be made which come within the scope of the disclosure of the specification.

What is claimed is:

1. In a torque-transmission coupling for a disc formed of brittle material, particularly a ceramic turbine disc, a shaft for mounting said disc thereonto, at least one axially pre-stressed cone pair for centering said disc on said shaft, said disc including a hub having a cylindrical extension, said extension being formed with profiled longitudinal grooves on the outer periphery thereof, said grooves having respective side walls, a cylindrical coupling bell having a bore and a coupling region and being rigidly fastened to said shaft, profiled longitudinal protuberances having concave side edges, said protuberances fitting into and engaging said longitudinal grooves within said bore for torque transmission, the improvement comprising said at least one axially pre-stressed cone pair being disposed in the coupling region of said coupling bell, and rollers radially and tangentially fitting between said concave side edges of said longitudinal protuberances and said side walls of said longitudinal grooves, respectively, for torque transmission distributed uniformly over the circumference of the coupling bell to said shaft through centrifugal force utilization, whereby thermal stresses between said disc of brittle material and said shaft, said cone pair, and said coupling bell are prevented.

2. A device as claimed in claim 1, comprising bores being formed in each of said rollers along the axes thereof.

* * * * *